US012710073B2

(12) United States Patent
Bargav R et al.

(10) Patent No.: US 12,710,073 B2
(45) Date of Patent: Aug. 18, 2026

(54) CRANKSHAFT NOSE END DESIGN

(71) Applicant: GM GLOBAL TECHNOLOGY OPERATIONS LLC, Detroit, MI (US)

(72) Inventors: Suman Bargav R, Bengaluru (IN); Durga Prasad Kandula, Bangalore (IN); James D. Cremonesi, Rochester Hils, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 18/502,423

(22) Filed: Nov. 6, 2023

(65) Prior Publication Data

US 2025/0146534 A1 May 8, 2025

(51) Int. Cl.

*F16D 1/06* (2006.01)
*F16C 3/06* (2006.01)
*F16D 1/09* (2006.01)
*F16H 55/36* (2006.01)

(52) U.S. Cl.

CPC .................. *F16D 1/06* (2013.01); *F16C 3/06* (2013.01); *F16D 1/09* (2013.01); *F16H 55/36* (2013.01)

(58) Field of Classification Search

CPC ............... F16D 1/06; F16D 1/09; F16H 55/36
See application file for complete search history.

(56) References Cited

U.S. PATENT DOCUMENTS 11,174,900 B2 * 11/2021 Post ........................ F16H 55/36

FOREIGN PATENT DOCUMENTS

| | | | | |
|---|---|---|---|---|
| DE | 10216082 A1 * | 6/2003 | | F16F 15/1207 |
| JP | S6368522 U | 5/1988 | | |
| JP | H04296214 A * | 10/1992 | | |
| JP | H1172121 A | 3/1999 | | |

OTHER PUBLICATIONS

JP-H04296214-A Machine English Translation (Year: 1992).*
DE 10216082 A1 Machine English Translation (Year: 2003).*

* cited by examiner

*Primary Examiner* — Jason D Shanske
*Assistant Examiner* — Matthew James O'Neill
(74) *Attorney, Agent, or Firm* — Ingrassia Fisher & Lorenz, LLP | IF&L

(57) ABSTRACT

Vehicles, crankshaft assemblies for vehicles, and methods for connecting vehicle accessory components and crankshafts are provided. A vehicle includes an engine configured to produce a linear motion output; a crankshaft configured to convert the linear motion output to rotational motion and terminating at an end with a tapered exterior surface extending to a central surface; an annular ring having a proximal ring surface, a distal ring surface, a ring opening, and a tapered inner surface, wherein the end of the crankshaft is received in the ring opening; and a fastener fixed to the crankshaft and holding the annular ring against the tapered exterior surface.

20 Claims, 7 Drawing Sheets

CRANKSHAFT NOSE END DESIGN

INTRODUCTION

The technical field generally relates to crankshaft assemblies in vehicles, and more particularly to the interconnection of the nose of the crankshaft to an accessory component, such as a gear or sprocket.

The crankshaft is one of the important components of the internal combustion engine. Apart from converting a linear motion of the piston to a rotational motion at one end, it also drives the accessories mounted to its opposite nose end. These accessory components are typically mounted on a cylindrical surface of the crankshaft and are sandwiched between a crankshaft planar shoulder and a bolt head.

Accordingly, it is desirable to provide crankshaft assemblies, vehicles, and methods for interconnecting crankshafts to accessory components that provide improved load isolation and reduce mean stress on the crankshaft nose fillet. Additionally, other desirable features and characteristics of the present disclosure will become apparent from the subsequent description taken in conjunction with the accompanying drawings and the foregoing introduction.

SUMMARY

A vehicle includes an engine configured to produce a linear motion output; a crankshaft configured to convert the linear motion output to rotational motion and terminating at an end with a tapered exterior surface extending to a central surface; an annular ring having a proximal ring surface, a distal ring surface, a ring opening, and a tapered inner surface, wherein the end of the crankshaft is received in the ring opening; and a fastener fixed to the crankshaft and holding the annular ring against the tapered exterior surface.

In an exemplary embodiment of the vehicle, the crankshaft is formed with a cavity in the central surface; the fastener includes an abutment surface and an extension extending from the abutment surface; and the extension is received in and engaged with the cavity of the central surface.

In an exemplary embodiment of the vehicle, the crankshaft extends along an axis; the crankshaft is formed with a cavity in the central surface extending along the axis to a cavity bottom; the cavity bottom defines a cavity plane perpendicular to the axis; and the cavity plane is located between the proximal ring surface and the distal ring surface.

In an exemplary embodiment of the vehicle, the crankshaft further includes an annular shoulder extending radially outward from the tapered exterior surface; and the annular shoulder is distanced from the proximal ring surface by a gap.

In an exemplary embodiment of the vehicle, the tapered exterior surface is formed with an angle of from 2 degrees to 60 degrees.

In an exemplary embodiment of the vehicle, the crankshaft is formed with a cavity in the central surface; the proximal ring surface is distanced from the distal ring surface by a ring length; the fastener includes an abutment surface and an extension extending from the abutment surface to an extension end; the extension end is distanced from the abutment surface by an extension length; the extension is received in and engaged with the cavity of the central surface; and the extension length is less than the ring length.

In an exemplary embodiment of the vehicle, at the proximal ring surface, the ring opening has a first diameter; the central surface has a second diameter; and the first diameter is at least 1.2 times the second diameter.

In an exemplary embodiment of the vehicle, at the proximal ring surface, the ring opening has a first diameter; the central surface has a second diameter; and the first diameter is at least 1.5 times the second diameter.

In an exemplary embodiment of the vehicle, at least a portion of the tapered exterior surface and/or the tapered inner surface is laser-treated to form a hardened rough surface region.

In an exemplary embodiment, the vehicle further includes a friction shim located between the tapered exterior surface and the tapered inner surface.

In an embodiment, a crankshaft assembly for a vehicle is provided and includes a crankshaft having including a shaft portion with a shaft end and including a nose portion located at the shaft end and having a distal nose surface formed with a cavity, and wherein the nose portion has a conical exterior surface increasing in diameter in a proximal direction from the distal nose surface; an annular ring having a proximal ring surface, a distal ring surface, a ring opening, and a conical inner surface, wherein the ring opening extends from the proximal ring surface to the distal ring surface, wherein the ring opening is defined by the conical inner surface, and wherein the conical inner surface is configured for receiving the conical exterior surface of the nose portion; and a connection element having a proximal abutment surface and an extension extending in the proximal direction from the proximal abutment surface, wherein the extension is configured to be received and secured in the cavity of the nose portion to compress the annular ring between the conical exterior surface of the nose portion and the proximal abutment surface of the connection element.

In an exemplary embodiment of the crankshaft assembly, the crankshaft further includes an annular shoulder joining the conical exterior surface; and the annular shoulder has a distal shoulder surface configured to be distanced from the proximal ring surface by a gap when the annular ring is compressed between the conical exterior surface of the nose portion and the proximal abutment surface of the connection element.

In an exemplary embodiment of the crankshaft assembly, the conical exterior surface is formed with an angle of from 2 degrees to 60 degrees.

In an exemplary embodiment of the crankshaft assembly, the conical exterior surface is formed with a first angle and the conical inner surface is formed with a second angle equal to the first angle.

In an exemplary embodiment of the crankshaft assembly, the proximal ring surface is distanced from the distal ring surface by a ring length; the extension extends from the proximal abutment surface to an extension end; the extension end is distanced from the proximal abutment surface by an extension length; and the extension length is less than the ring length.

In an exemplary embodiment of the crankshaft assembly, at the proximal ring surface, the ring opening has a first diameter; at the distal nose surface, the nose portion has a second diameter; and the first diameter is at least 1.5 times the second diameter.

In an exemplary embodiment of the crankshaft assembly, at least a portion of the conical exterior surface and/or the conical inner surface is laser-treated to form a hardened rough surface region.

In an exemplary embodiment, the crankshaft assembly further includes a friction shim configured to be compressed between the conical exterior surface and the conical inner surface.

In one embodiment, a method is provided for connecting a vehicle accessory component to a crankshaft. The method includes locating an end of the crankshaft in an opening of the vehicle accessory component, wherein the end of the crankshaft has a tapered exterior surface extending to a central surface formed with a cavity, and wherein the vehicle accessory component has a proximal surface, a distal surface, and a tapered inner surface defining the opening; inserting an extension of a fastener in the cavity, wherein the fastener has an abutment surface; and tightening the fastener to contact the distal surface of the vehicle accessory component and force the vehicle accessory component toward the tapered exterior surface.

In an exemplary embodiment of the method, the tapered exterior surface and/or the tapered inner surface is laser-treated and has a hardened rough surface region; and/or the method further includes locating a friction shim between the tapered exterior surface and the tapered inner surface before locating the end of the crankshaft in the opening of the vehicle accessory component, wherein tightening the fastener to contact the distal surface of the vehicle accessory component and force the vehicle accessory component toward the tapered exterior surface includes compressing the friction shim.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
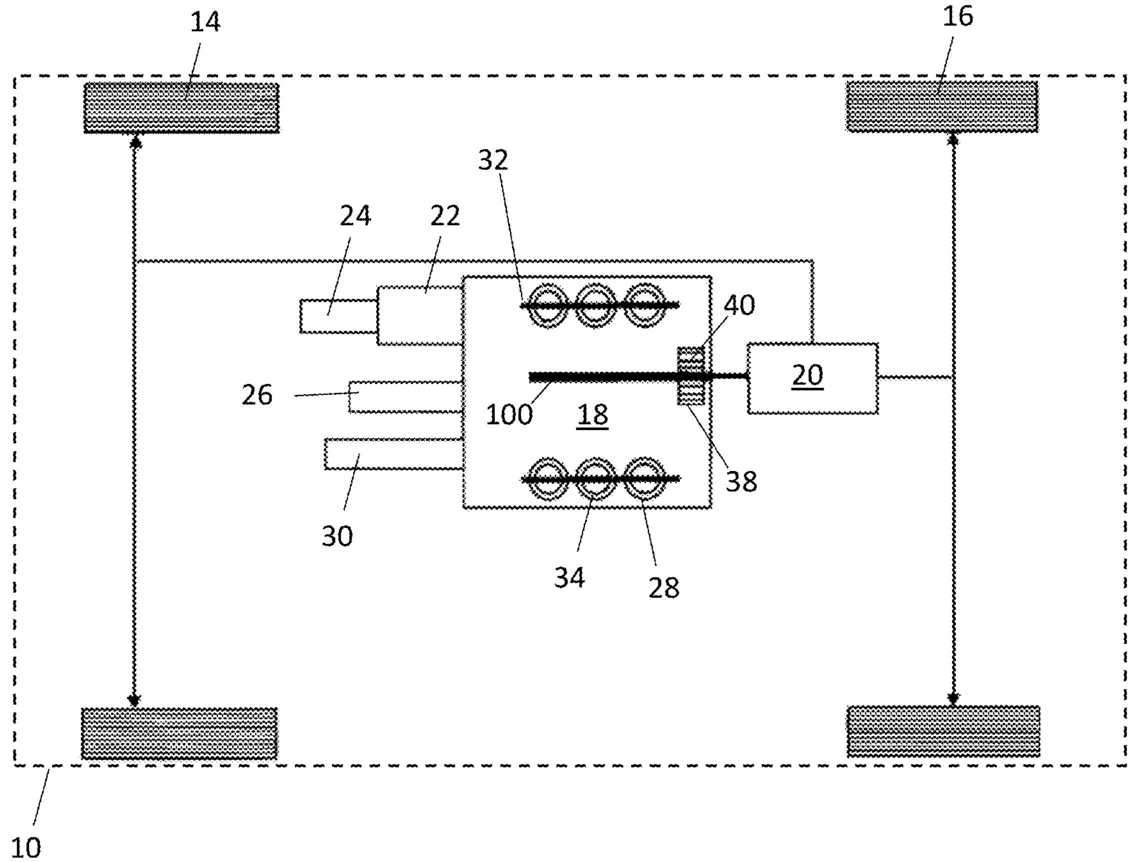
FIG. 1 is a schematic diagram illustrating a vehicle including a crankshaft connected to an engine in accordance with exemplary embodiments of the present disclosure.

The following detailed description is merely exemplary in nature and is not intended to limit the application and uses of embodiments herein. Furthermore, there is no intention to be bound by any expressed or implied theory presented in the preceding introduction and brief summary or the following detailed description. As used herein, the term "module" refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that the figures are merely illustrative and may not be drawn to scale.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Embodiments herein address the connection of a crankshaft, and specifically, the nose portion or fillet of the crankshaft, to an accessory component via a connection element or fastener such as a bolt.

Embodiments herein provide for isolation of the crankshaft nose fillet portion from the load transfer path. Isolation is achieved by introducing a tapered external surface at the distal end of the crankshaft nose portion and a reciprocal tapered inner surface in the accessory component. Axial motion of the accessory component is constrained by the taper angle. Unlike conventional structures, the accessory component does not contact or support the crankshaft shoulder. With this isolation, the mean stresses on the nose fillet portions are highly reduced.

Thus, embodiments herein eliminate a load transfer path along the crankshaft nose fillet portion. The load transfer path found in conventional assemblies often results in higher mean stress on the crankshaft nose portion. Specifically, in conventional designs, the accessory components are mounted on the typical cylindrical surfaces of the crankshaft and are sandwiched between the crankshaft planar shoulder and the bolt head, creating a load path which results in high stresses on the nose fillet portion. Such stresses are avoided herein.

Referring to the drawings, wherein like reference numbers correspond to the same or similar components throughout the several views, there is shown in FIG. 1 a schematic representation of a vehicle 10. Embodiments will be described herein with respect to the vehicle 10 as an exemplary application. As such, it should be readily understood that FIG. 1 is merely an exemplary application by which the present embodiments may be incorporated and practiced, i.e., the subject matter is not limited to the particular configuration of FIG. 1.

The vehicle 10 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). In various embodiments, the vehicle 10 may incorporate any one of, or combination of, a number of different types of engines, such as, for example, a gasoline or diesel fueled combustion engine, a flex fuel vehicle (FFV) engine (i.e., using a mixture of gasoline and alcohol), or a hybrid vehicle.

As shown, the vehicle 10 includes an engine system 12, driven wheels 14 and wheels 16, and a crankshaft 100. The engine system 12 produces a linear motion output that the crankshaft converts to a torque output to drive the driven wheels 14 and to optionally drive the wheels 16. The engine system 12 includes an internal combustion engine 18 connected to a transmission 20. The internal combustion engine 18 includes an intake manifold 22 and a throttle 24. Air flow into the intake manifold 22 is regulated by the throttle 24. The air flow from the intake manifold 22 and fuel from a fuel pump 26 is ignited in a plurality of cylinders 28 by an ignition system 30. A valve train 32 assists in, among other things, regulation of combustion in the cylinders 28. Combustion in each of the cylinders 28 drives a piston 34, which rotatably drives the crankshaft 100. While internal combustion engines utilizing a spark ignition are described, the embodiments herein apply to diesel and other sparkless and throttle-less compression ignition engines.

A timing wheel 38 is connected to the crankshaft 100. The timing wheel 38 contains a plurality of timing teeth 40 that individually correspond to respective crankshaft positions. It is appreciated that in some embodiments, the timing wheel 38 contains sixty timing teeth 40. As such, each timing tooth 40 corresponds to approximately six degrees of crankshaft rotation. It will be additionally appreciated that the number of timing teeth 40 on the timing wheel 38 and crankshaft rotation per tooth 40 can vary.

Figure 2:
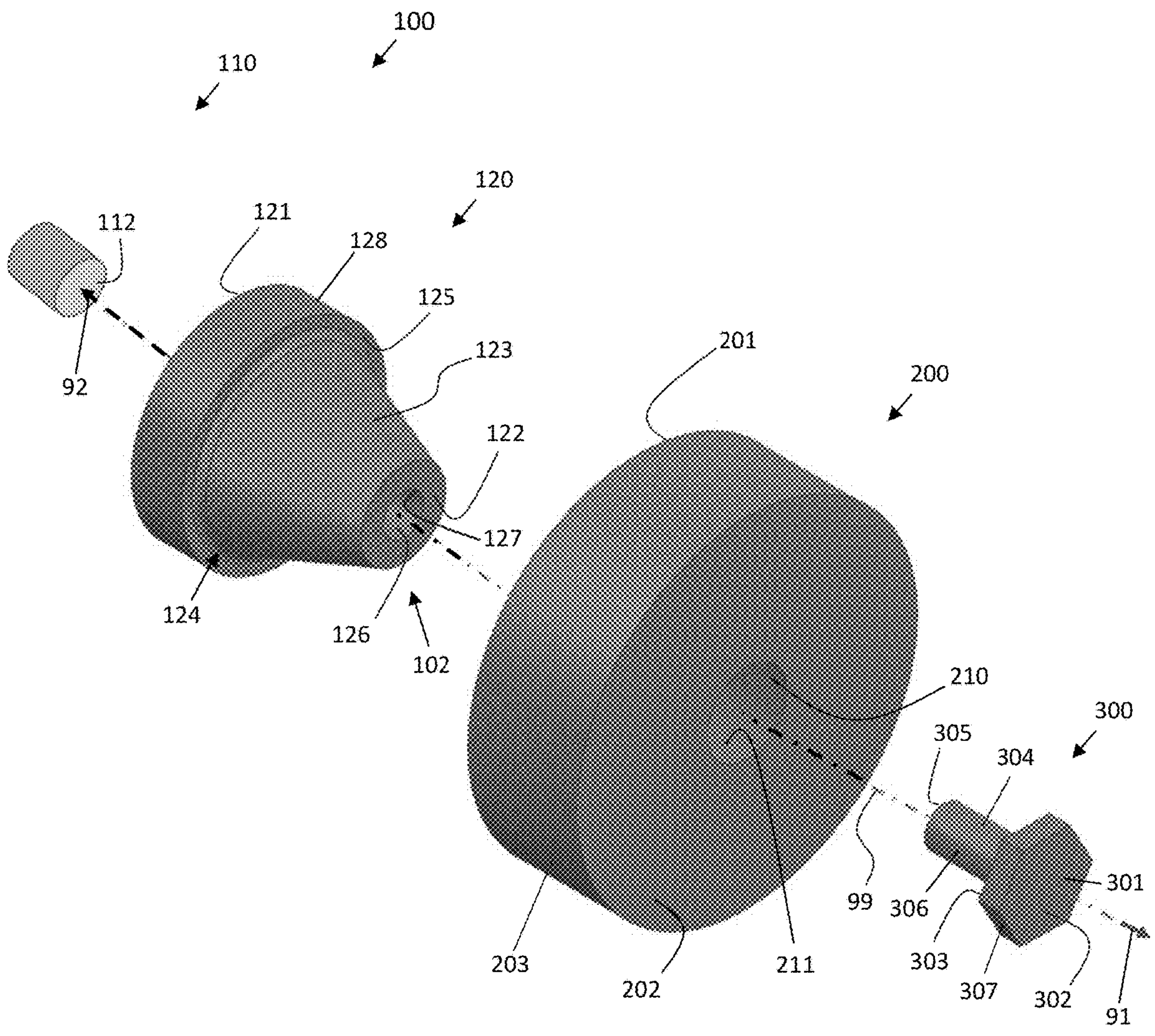
FIG. 2 is an exploded view of the nose end of the crankshaft and the interconnecting accessory component and fastener in accordance with exemplary embodiments of the present disclosure.

Referring now to FIG. 2, the crankshaft 100 is further described. Specifically, the interconnection of an end 102 of the crankshaft to a vehicle accessory component 200 is shown. Such interconnection may be accomplished using a connection element 300 or fastener 300.

As shown in FIG. 2, the crankshaft 100 includes a shaft portion 110 and a nose portion 120. The shaft portion 110 extends along and defines an axis 99. As shown, the shaft portion 110 extends in a distal direction 91 along the axis 99 and terminates at a shaft end 112.

The shaft end 112 is configured for connection to the nose portion 120. In certain embodiments, the nose portion 120 may be formed integrally with the shaft end 112 of the shaft portion 110.

In FIG. 2, the nose portion 120 extends in the distal direction 91 from a proximal end surface 121 to a distal nose surface 122. In exemplary embodiments, the distal nose surface 122 is circular. As further shown, the nose portion 120 has an exterior surface 123 that extends in a proximal direction 92 from the distal nose surface 122 to an annular shoulder 124. Specifically, the exterior surface 123 extends in the proximal direction 92 from the distal nose surface 122 to an annular distal shoulder surface 125 of annular shoulder 124.

The exterior surface 123 may be tapered. For example, the exterior surface 123 may be conical. As shown, the nose portion 120 increases in diameter from the distal nose surface 122 to the annular shoulder 124. In certain embodiments, the increase in diameter from the distal nose surface 122 to the annular shoulder 124 is linear.

In certain embodiments, the end 102 of the crankshaft 100 is defined by the exterior surface 123 and the distal nose surface 122, which may be identified as a central surface 122 surrounded by the exterior surface 123. As shown, a cavity 126 is formed in the distal nose surface 122 and extends into the nose portion 120 in the proximal direction 92, i.e., toward the proximal end surface 121. The cavity 126 may be formed by a threaded sidewall 127.

In exemplary embodiments, the annular distal shoulder surface 125 is perpendicular to the axis 99, the proximal end surface 121 is perpendicular to the axis 99, and the distal nose surface 122 is perpendicular to the axis 99. As shown, the annular shoulder 124 has an outer side surface 128. In exemplary embodiments, the outer side surface 128 is cylindrical and is centered about the axis 99.

As shown in FIG. 2, the vehicle accessory component 200 is ring-shaped, and is referred to as an annular ring 200. The vehicle accessory component 200 may be a gear, sprocket, or other component configured to be rotated by connection to the crankshaft 100.

The annular ring 200 extends in the distal direction 91 from a proximal end surface 201 to a distal end surface 202. In certain embodiments, the proximal end surface 201 and the distal end surface 202 are parallel and are perpendicular to the axis 99. As shown, the annular ring 200 has an outer side surface 203. In exemplary embodiments, the outer side surface 203 is cylindrical. In certain embodiments, the outer side surface 203 is centered on the axis 99.

As shown, the annular ring 200 is formed with an opening 210. The opening 210 extends in the proximal direction 92 from the distal end surface 202 to the proximal end surface 201 while increasing in diameter as shown and described in relation to the following figures.

In FIG. 2, the fastener 300 is illustrated as a threaded bolt. As shown, the fastener 300 includes a head 301 having a distal end surface 302. The head 301 extends in the proximal direction 92 from the distal end surface 302 to a proximal abutment surface 303. As further shown, the fastener 300 includes an extension 304 that extends along the axis 99 from the proximal abutment surface 303 to an extension end 305. The extension 304 has an extension side surface 306 that may be formed with threads. Further, the head 301 has an external side surface 307 that is configured to be gripped by a tool. For example, the external side surface 307 may be hexagonal as shown.

As may be understood from FIG. 2, the nose portion 120 of the crankshaft 100 is received on and fixed to, or is formed integrally with, the shaft portion 110 of the crankshaft 100. Further, the annular ring 200 is received on the exterior surface 123 of the nose portion 120. In other words, the nose portion 120 is inserted into the opening 210 of the annular ring 200. Also, the extension 304 is inserted through the opening 210 in the annular ring 200 and into the cavity 126. In exemplary embodiments, threads on the extension 304 mate with threads on the sidewall 127 of the cavity 126 such that the fastener 300 may be tightened, i.e., force in the proximal direction 92.

When tightened, the proximal abutment surface 303 of the fastener 300 contacts the distal end surface 202 and applies a force on the annular ring 200 in the proximal direction. Also, the threaded engagement of the extension 304 and cavity 126 pulls the nose portion 120 in the distal direction 91. As a result, the fastener 300 provides for fixing the nose portion 120 and the annular ring 200 together.

Referring now to FIGS. 3-6, cross-sectional views each separate component and of the assembled nose portion 120, annular ring 200, and fastener 300 are illustrated, respectively.

Figure 3:
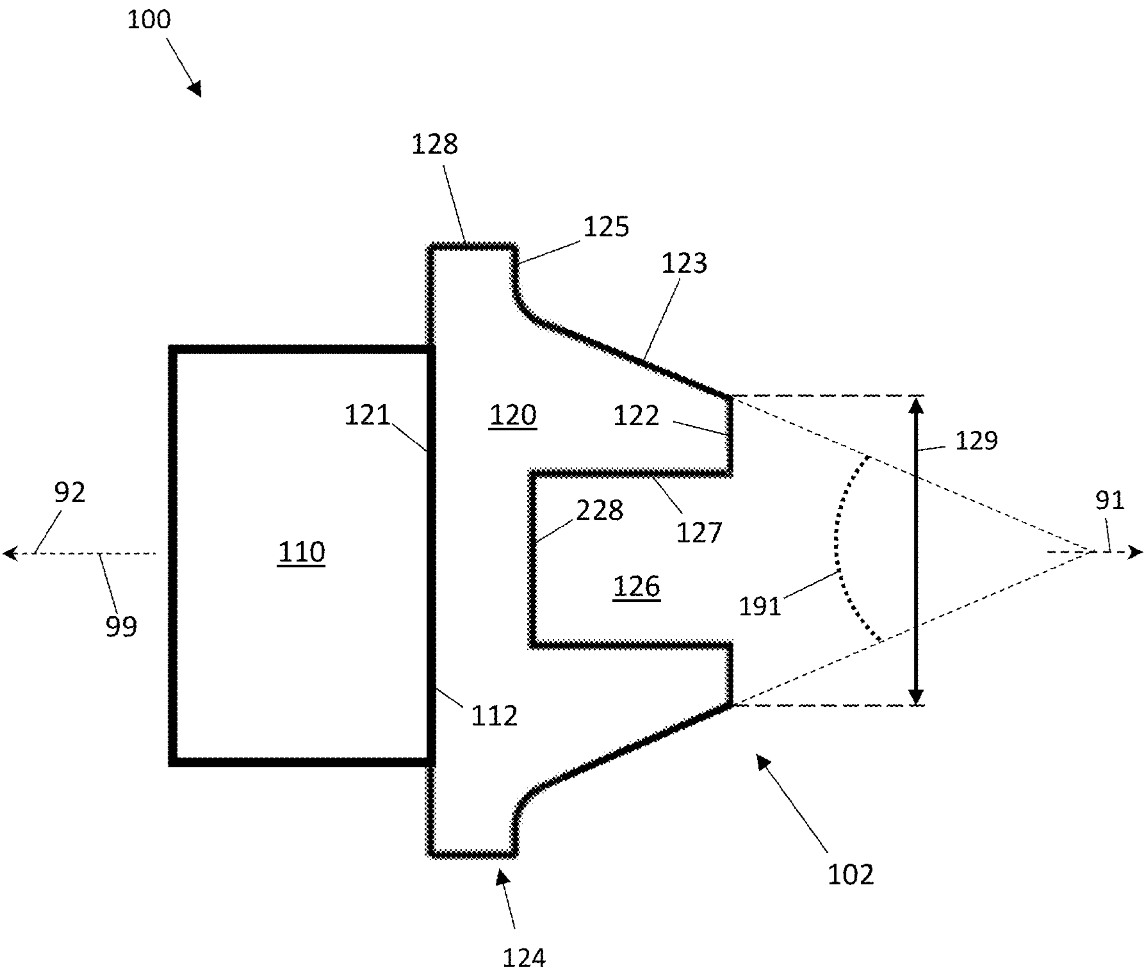
FIG. 3 is a cross-sectional view of the nose end of the crankshaft of FIG. 2 in accordance with exemplary embodiments of the present disclosure.

FIG. 3 illustrate a portion of the crankshaft 100. In FIG. 3, the connection between the shaft portion 110 and the nose portion 120 is illustrated. Specifically, the shaft end 112 of the shaft portion 110 contacts the proximal end surface 121 of the nose portion 120. As noted above, the shaft portion 110 and nose portion 120 may be integral, i.e., unitary or one-piece.

FIG. 3 illustrates that the cavity 126 is formed with a sidewall 127 that extends in the proximal direction 92 from the distal nose surface 122 to a cavity bottom 228.

FIG. 3 also illustrates that the distal nose surface 122 or central surface 122 has an outer diameter 129 at the interfaced with the exterior surface 123.

As shown in FIG. 3, the exterior surface 123 forms opposite linear cross-sections that intersect to form an angle 191. In other words, the exterior surface 123 is formed as a conical section about the angle 191, or is tapered by the angle 191. In exemplary embodiments, angle 191 is from 2 to 60 degrees. For example, angle 191 may be at least 2, at least 3, at least 4, at least 5, at least 10, at least 15, at least 20, at least 25, at least 30, at least 35, or at least 40 degrees. Also, angle 191 may be at most 60, at most 55, at most 50, at most 45, at most 40, at most 35, or at most 30 degrees.

Figure 4:
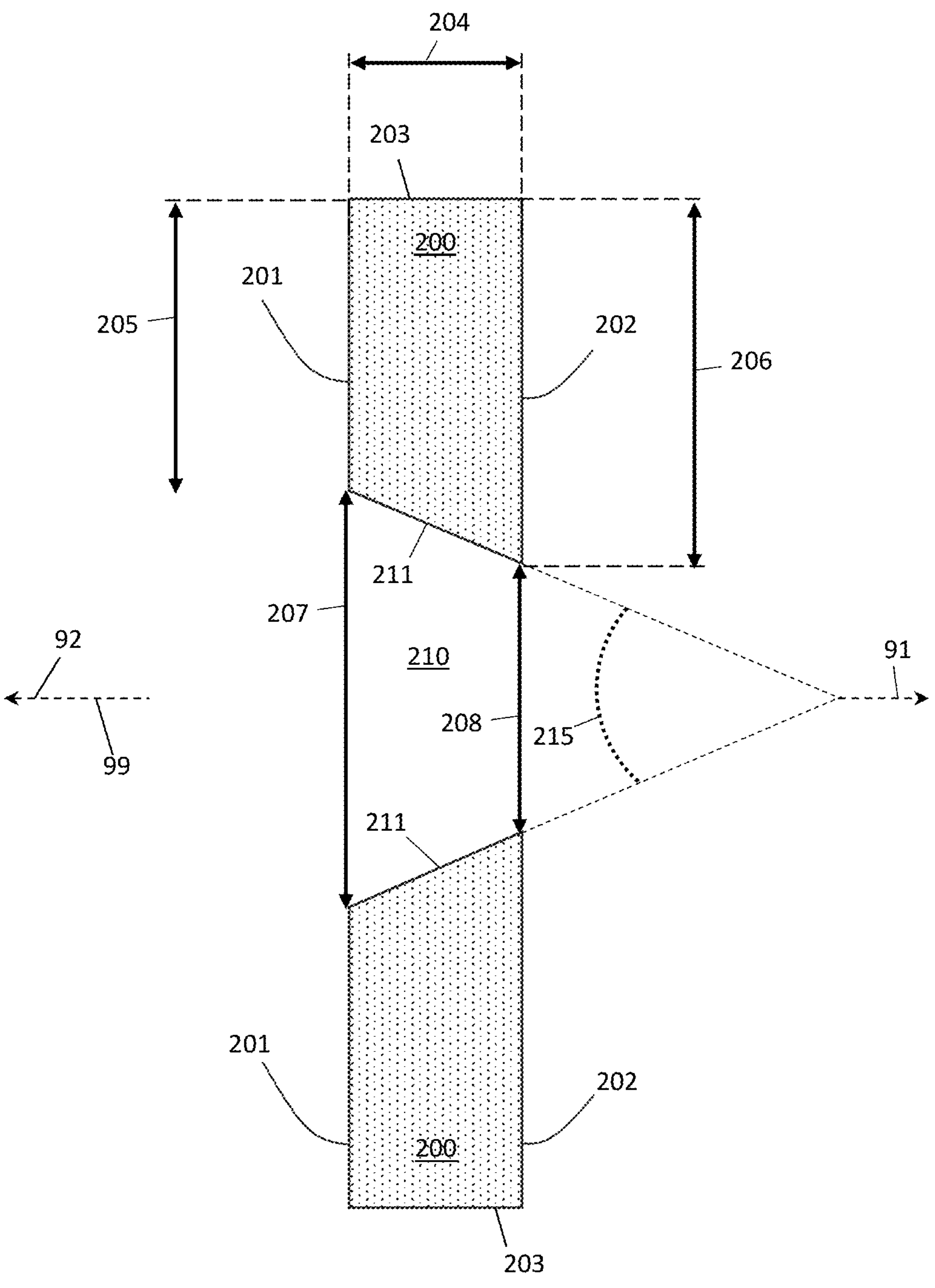
FIG. 4 is a cross-sectional view of the accessory component of FIG. 2 in accordance with exemplary embodiments of the present disclosure.

FIG. 4 illustrates the accessory component 200. As shown, the proximal end surface 201 and the distal end surface 202 are distanced from one another by an axial length 204. In certain embodiments the axial length 204 is greater than the axial length 309 of the extension 304 of the fastener 300.

Further, the proximal end surface 201 extends radially outward for a distance 205 from the opening sidewall or inner surface 211 to the outer side surface 203. Likewise, the distal end surface 202 extends radially outward for a distance 206 from the opening sidewall or inner surface 211 to the outer side surface 203.

The opening 210 has a major diameter 207 at the proximal end surface 201. In exemplary embodiments, the major diameter 207 is from 25 mm to 80 mm. For example, major diameter 207 may be at least 25 nm, such as at least 30 mm, at least 35 mm, at least 40 mm, at least 45, at least 50, at least 55, at least 60, at least 65 or at least 70 mm. Also, major diameter 207 may be at most 80 mm, such as at most 75 mm, at most 70 mm, at most 65 mm, at most 60 mm, at most 55 mm, at most 50 mm, at most 45 mm, at most 40 mm, at most 35 mm, or at most 30 mm.

The opening 210 has a diameter 208 at the distal end surface 202. In exemplary embodiments, the diameter 208 is from 20 mm to 75 mm. For example, diameter 208 may be at least 20 nm, such as at least 25 nm, at least 30 mm, at least 35 mm, at least 40 mm, at least 45, at least 50, at least 55, at least 60, at least 65 or at least 70 mm. Also, diameter 208 may be at most 75 mm, such as at most 70 mm, at most 65 mm, at most 60 mm, at most 55 mm, at most 50 mm, at most 45 mm, at most 40 mm, at most 35 mm, or at most 30 mm.

As shown in FIG. 4, the inner surface 211 forms opposite linear cross-sections that intersect to form an angle 215. In other words, the inner surface 211 is formed as a conical section about the angle 215, or is tapered by the angle 215. In exemplary embodiments, angle 215 is from 2 to 60 degrees. For example, angle 215 may be at least 2, at least 3, at least 4, at least 5, at least 10, at least 15, at least 20, at least 25, at least 30, at least 35, or at least 40 degrees. Also, angle 215 may be at most 60, at most 55, at most 50, at most 45, at most 40, at most 35, or at most 30 degrees. In exemplary embodiments angle 215 is equal to angle 191.

Figure 5:
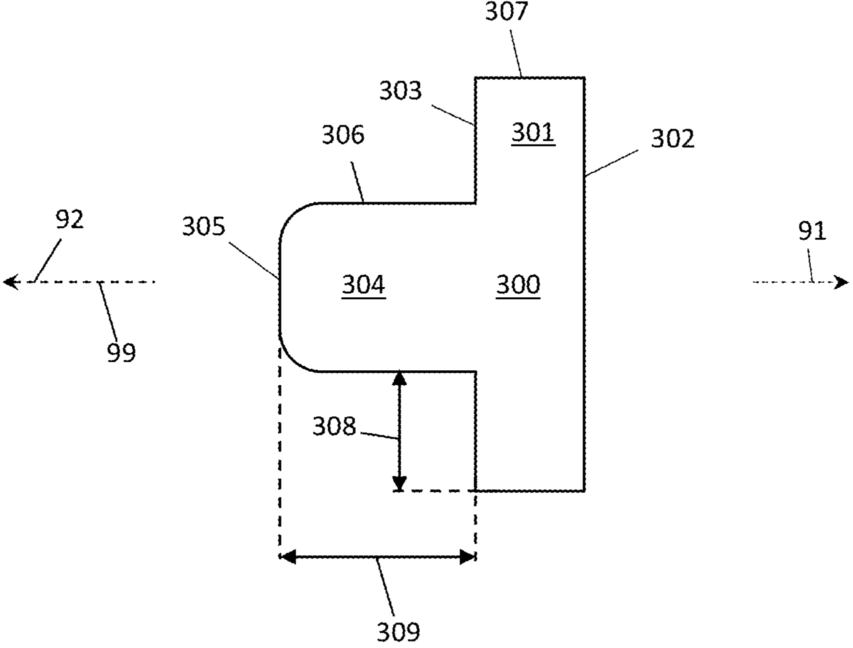
FIG. 5 is a cross-sectional view of the end of the crankshaft of FIG. 2 in accordance with exemplary embodiments of the present disclosure.

FIG. 5 illustrates the fastener 300. As shown, the abutment surface 303 extends radially outward from the extension side surface 306 to the external side surface 307 and has a radial length 308. Further, the extension 304 extends from the abutment surface 303 to the extension end 305 and has an axial length 309. The distal end surface 302 and the proximal abutment surface 303 may each be perpendicular to the axis 99 and parallel to one another.

Cross-referencing FIG. 6 and FIGS. 3-5, the engagement of the assembled nose portion 120, annular ring 200, and fastener 300 is described. As shown, the nose portion 120 of the end 102 of the crankshaft 100 is received within the opening 210 of the accessory component 200. Further, the extension 304 of the fastener 300 is received in the opening 210 of the accessory component 200 and in the cavity 126 of the nose portion 120.

Threaded engagement, or another suitable engagement, is used to tighten and draw the extension 304 into the cavity 126. As a result, the distal end surface 202 contacts the abutment surface 303 and the nose portion 120 is drawn into the opening 210.

The exterior surface 123 of the nose portion 120 and the inner surface 211 of the opening 210 create a connection interface 400. At the interface 400, the tapered outside surface 123 of the crankshaft 100 and its counterpart, the tapered inner surface 211 of the accessory component 200 lock and constrain axial motion into the crankshaft.

As shown, after tightening the fastener 300, the annular distal shoulder surface 125 of the shoulder 124 of the nose portion 120 is separated from the proximal end surface 201 of the accessory component 200 by a gap 500 having an axial distance 501. In exemplary embodiments, the axial distance 501 may be from 1 mm to 10 mm. For example, the axial distance 501 may be at least 1 mm, at least 1.5 mm, at least 2 mm, at least 3 mm, at least 4 mm, at least 5 mm, at least 6 mm, at least 7 mm, or at least 8 mm. Also, the axial distance 501 may be at most 10 mm, such as at most 9.5 mm, at most 9 mm, at most 8 mm, at most 7 mm, at most 6 mm, at most 5 mm, at most 4 mm, at most 3 mm, or at most 2 mm.

Further, after tightening the fastener 300, the distal end surface 202 is separated from the proximal abutment surface 303 by a gap 600 having an axial distance 601. In exemplary embodiments, the axial distance 601 may be from 1 mm to 10 mm. For example, the axial distance 601 may be at least 1 mm, at least 1.5 mm, at least 2 mm, at least 3 mm, at least 4 mm, at least 5 mm, at least 6 mm, at least 7 mm, or at least 8 mm. Also, the axial distance 601 may be at most 10 mm, such as at most 9.5 mm, at most 9 mm, at most 8 mm, at most 7 mm, at most 6 mm, at most 5 mm, at most 4 mm, at most 3 mm, or at most 2 mm.

Because there is no contact between nose portion 120 of the crankshaft 100 and the proximal end surface 201 of the accessory component 200, there is no bending stress on the accessory component 200. In other words, because of the presence of the gap 500, the accessory component 200 does not provide structural support of the crankshaft shoulder 124.

Figure 6:
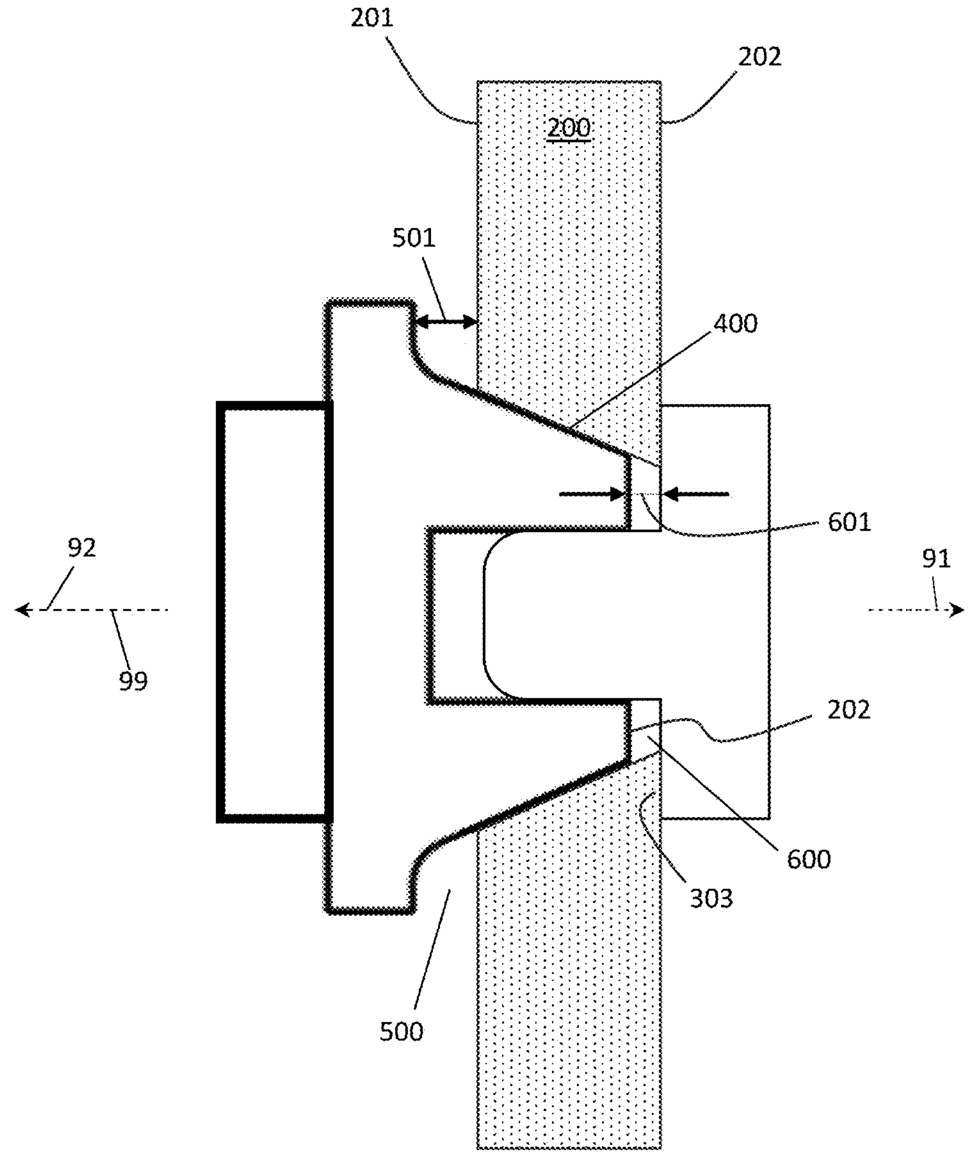
FIG. 6 is a cross-sectional view of the connected crankshaft, accessory component, and fastener in accordance with exemplary embodiments of the present disclosure.

As a result of the interconnection of FIG. 6, the crankshaft nose fillet is isolated from the load transfer path. Further, fatigue strength is increased as compared to conventional designs because mean stress is reduced. Also, the torque capacity of the interconnection is higher than conventional designs. For example, the torque capacity of the interconnection between the crankshaft 100 and the accessory component 200 may be calculated according to the equation:

$$T = \frac{F\mu}{3\sin\alpha}\left(\frac{D^3 - d^3}{D^2 - d^2}\right)$$

where T is the torque capacity,

F is the clamping force,

μ is the coefficient of friction,

D is the major diameter (diameter 207), d is the minor diameter (diameter 129), and α is the taper angle (angle 191 or angle 215).

While various length, distances, and angles may be described herein, the taper angle, major and minor diameters can be varied to meet desired packing requirement and torque capacities.

Figure 7:
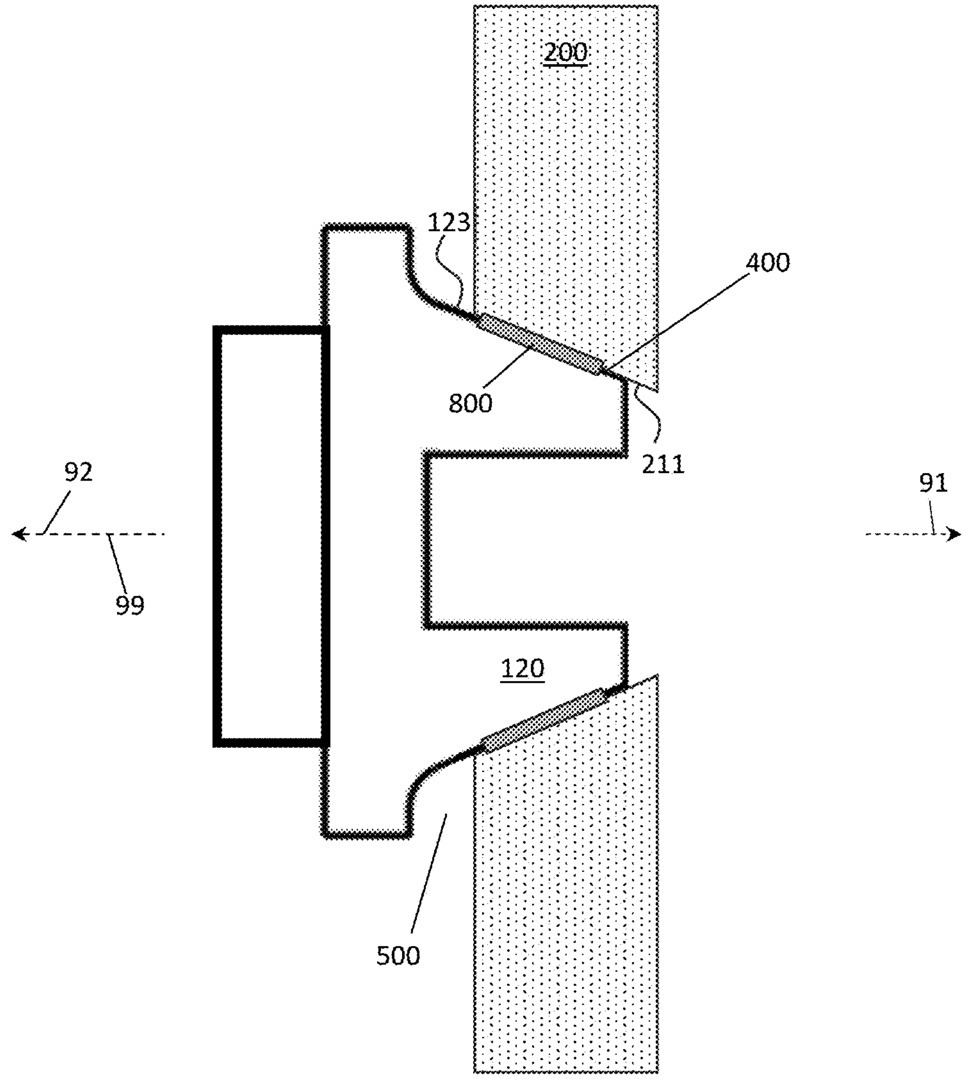
FIG. 7 is a cross-sectional view of the connected crankshaft and accessory component, illustrating a friction region at the interface therebetween in accordance with exemplary embodiments of the present disclosure.

Referring now to FIG. 7, a friction region 800 is included at the interface 400 to increase the coefficient of friction. For example, the friction region 800 may be formed on one of, or both of, the exterior surface 123 and the inner surface 211. For example, either or both of exterior surface 123 and the inner surface 211 may be laser-treated to form a hardened, rough surface. Alternatively or additionally, the friction region 800 may be formed by a friction shim. Specifically, the friction region 800 may be a thin metal, such as having a thickness of 0.1 millimeter, and be coated with a diamond dust slurry.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:

an engine configured to produce a linear motion output;

a crankshaft configured to convert the linear motion output to rotational motion and terminating at an end with a tapered exterior surface extending to a central surface;

an annular ring having a proximal ring surface, a distal ring surface, a ring opening, and a tapered inner surface, wherein the end of the crankshaft is received in the ring opening;

a friction shim located between the tapered exterior surface and the tapered inner surface; and a fastener fixed to the crankshaft and holding the annular ring against the tapered exterior surface.

2. The vehicle of claim 1, wherein:

the crankshaft is formed with a cavity in the central surface;

the fastener includes an abutment surface and an extension extending from the abutment surface; and the extension is received in and engaged with the cavity of the central surface.

3. The vehicle of claim 1, wherein:

the crankshaft extends along an axis;

the crankshaft is formed with a cavity in the central surface extending along the axis to a cavity bottom;

the cavity bottom defines a cavity plane perpendicular to the axis; and the cavity plane is located between the proximal ring surface and the distal ring surface.

4. The vehicle of claim 1, wherein:

the crankshaft further comprises an annular shoulder extending radially outward from the tapered exterior surface; and the annular shoulder is distanced from the proximal ring surface by a gap.

5. The vehicle of claim 1, wherein the tapered exterior surface is formed with an angle of from 2 degrees to 60 degrees.

6. The vehicle of claim 1, wherein:

the crankshaft is formed with a cavity in the central surface;

the proximal ring surface is distanced from the distal ring surface by a ring length;

the fastener includes an abutment surface and an extension extending from the abutment surface to an extension end;

the extension end is distanced from the abutment surface by an extension length;

the extension is received in and engaged with the cavity of the central surface; and the extension length is less than the ring length.

7. The vehicle of claim 1, wherein:

at the proximal ring surface, the ring opening has a first diameter;

the central surface has a second diameter; and the first diameter is at least 1.2 times the second diameter.

8. The vehicle of claim 1, wherein:

at the proximal ring surface, the ring opening has a first diameter;

the central surface has a second diameter; and the first diameter is at least 1.5 times the second diameter.

9. The vehicle of claim 1, wherein at least a portion of the tapered exterior surface and/or the tapered inner surface is laser-treated to form a hardened rough surface region.

10. The vehicle of claim 1, wherein the friction shim comprises a metal layer coated with a diamond dust slurry.

11. A crankshaft assembly for a vehicle, the crankshaft assembly comprising:

a crankshaft comprising a shaft portion with a shaft end and comprising a nose portion located at the shaft end and having a distal nose surface formed with a cavity, and wherein the nose portion has a conical exterior surface increasing in diameter in a proximal direction from the distal nose surface;

an annular ring having a proximal ring surface, a distal ring surface, a ring opening, and a conical inner surface, wherein the ring opening extends from the proximal ring surface to the distal ring surface, wherein the ring opening is defined by the conical inner surface, and wherein the conical inner surface is configured for receiving the conical exterior surface of the nose portion;

a friction shim configured to be compressed between the conical exterior surface and the conical inner surface; and a connection element having a proximal abutment surface and an extension extending in the proximal direction from the proximal abutment surface, wherein the extension is configured to be received and secured in the cavity of the nose portion to compress the annular ring between the conical exterior surface of the nose portion and the proximal abutment surface of the connection element.

12. The crankshaft assembly of claim 11, wherein the crankshaft further comprises an annular shoulder joining the conical exterior surface; wherein the annular shoulder has a distal shoulder surface configured to be distanced from the proximal ring surface by a gap when the annular ring is compressed between the conical exterior surface of the nose portion and the proximal abutment surface of the connection element.

13. The crankshaft assembly of claim 11, wherein the conical exterior surface is formed with an angle of from 2 degrees to 60 degrees.

14. The crankshaft assembly of claim 11, wherein the conical exterior surface is formed with a first angle and the conical inner surface is formed with a second angle equal to the first angle.

15. The crankshaft assembly of claim 11, wherein:

the proximal ring surface is distanced from the distal ring surface by a ring length;

the extension extends from the proximal abutment surface to an extension end;

the extension end is distanced from the proximal abutment surface by an extension length; and the extension length is less than the ring length.

16. The crankshaft assembly of claim 11, wherein:

at the proximal ring surface, the ring opening has a first diameter;

at the distal nose surface, the nose portion has a second diameter; and the first diameter is at least 1.5 times the second diameter.

17. The crankshaft assembly of claim 11, wherein at least a portion of the conical exterior surface and/or the conical inner surface is laser-treated to form a hardened rough surface region.

18. The crankshaft assembly of claim 11, wherein the friction shim comprises a metal layer coated with a diamond dust slurry.

19. A method for connecting a vehicle accessory component to a crankshaft, the method comprising:

locating a friction shim on a tapered exterior surface at an end of the crankshaft;

locating an end of the crankshaft in an opening of the vehicle accessory component, wherein the tapered exterior surface extends to a central surface formed with a cavity, and wherein the vehicle accessory component has a proximal surface, a distal surface, and a tapered inner surface defining the opening;

inserting an extension of a fastener in the cavity, wherein the fastener has an abutment surface; and tightening the fastener to contact the distal surface of the vehicle accessory component and force the vehicle accessory component toward the tapered exterior surface, wherein tightening the fastener comprises compressing the friction shim between the tapered exterior surface and the tapered inner surface.

20. The method of claim 19, wherein at least a portion of the tapered exterior surface and/or the tapered inner surface is laser-treated and has a hardened rough surface region.

* * * * *